United States Patent Office 3,308,116
Patented Mar. 7, 1967

3,308,116
2-CARBOXY AMIDE-3-AMINO AND
2,3-ISOXAZOLE STEROIDS
Pietro de Ruggieri, Carmelo Gandolfi, and Umberto
Guzzi, Milan, Italy, assignors to Ormonoterapia Richter
S.p.A., Milan, Italy
No Drawing. Filed July 6, 1964, Ser. No. 380,626
Claims priority, application Italy, July 5, 1963,
14,023/63; June 9, 1964, 12,667/64
4 Claims. (Cl. 260—211.5)

This invention relates to 2-carboxy-amide-2 - ene - 3-amine-derivatives of androstane, estrane and cholestane, having the formula:

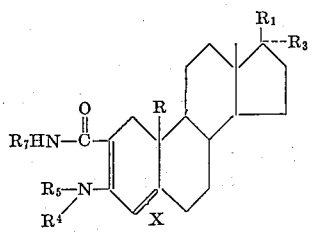

wherein:
R is hydrogen or methyl
$R_1$ is $C_8H_{17}$ or $OR_2$, where $R_2$ is hydrogen or an aliphatic acid radical of 2 to 10 carbon atoms
$R_3$ is hydrogen or lower alkyl
$R_5$ is hydrogen when
$R_4$ is hydrogen, lower alkyl, ribosyl, 2'-deoxyribosyl, 2',3',5'-tri-O-benzoyl-ribosyl, 3',5'-di-O-benzoyl-2'-deoxyribosyl,

CO-lower alkyl, COOEt, or CONHR$_6$, or $R_4$ and $R_5$ may together be =CHNH—R$_6$ or =CHO—R$_6$, R$_6$ being H or lower alkyl
$R_7$ is hydrogen, lower alkyl, benzyl, acyl (of 1 to 4 carbon atoms), CO—NHR$_6$ or COOEt, and X is a single or double bond; and to intermediate compounds for the preparation thereof.

These compounds are therapeutically valuable in the treatment of hypertension, and hyperlipidemia and they are also important intermediates in the synthesis of valuable steroid compounds. The starting materials for these compounds are the 5'-amino-(3,2-c)-isoxazoles of our copending U.S. application, Serial No. 279,630, filed May 10, 1963 and now U.S. Patent No. 3,185,684, and the 2-carboxylic acid-amide-2-ene-3-enol-ethers of copending application Serial No. 380,640, filed of even date herewith. The invention is further illustrated by the following examples, which are not limitative thereof.

Example 1.—5'-amino-(3,2-c)-isoxazole-cholestane

A solution of 5 parts of 2α-cyano-cholestane-3-one in 80 parts of ethanol is refluxed for 2 hours with a solution comprising 1.3 parts of hydroxylamine hydrochloride and 2.6 parts of sodium acetate 3H$_2$O in 8 parts of water. The mixture is diluted with water and filtered; upon crystallization from methanol, 3.9 parts of 5'-amino-(3,2-c)-isoxazole-cholestane, M.P. 215–217° C., are obtained; (α)$_D$=+42° (chloroform).

Example 2.—5'-(N-benzylidene)-amino-(3,2-c)-isoxazole-5α-androstane-17β-ol 1.2 parts of benzoic aldehyde are added to a solution of 3.40 parts of 5'-amino-(3,2-c)-isoxazole-5α-androstane-17β-ol in 25 parts of methanol, and the mixture is kept standing at room temperature for 3 hours. The mixture is then filtered, and upon crystallization from methylene chloride-methanol, there are obtained 3.85 parts of 5'-(N-benzylidene)-amino-(3,2-c)-isoxazole-5α - androstane-17β-ol.

Example 3.—5'-(N-benzylidene)-amino-(3,2-c)-isoxazole-5α-estrane-17β-ol

When the same procedure as that of Example 2 is followed, except for using 3.5 parts of 5'-amino-(3,2-c)-isoxazole-5α-estrane-17β-ol as the starting material, 3.17 parts of 5'-(N-benzylidene)-amino-(3,2-c)-isoxazole - 5α-estrane-17β-ol are obtained.

Example 4.—5'-(N-benzylidene)-amino-(3,2-c)-isoxazole-cholestane

When the same procedure as that of Example 2 is followed, except for using 3.2 parts of 5'-amino-(3,2-c)isoxazole-cholestane as the starting material, 2.97 parts of 5'-(N-benzylidene)-amino-(3,2-c) - isoxazole-cholestane are obtained.

Example 5.—2-(carboxylic acid-N-formylamide)-3-amino-17β-acetoxy-5α-androst-2-ene A solution of 2.4 parts of 5'-(N-benzylidene)-amino-(3,2-c)-isoxazole-5α-androstane-17β-ol in 9.6 parts of pyridine and 4.8 parts of acetic anhydride is allowed to stand overnight at room temperature, and then diluted with water. The mixture is filtered and crystallized from methanol, and 2.38 parts of 5-(N-benzylidene)-amino-(3,2-c)-isoxazole-17β-acetoxy-5α-androstane, M.P. 215°– 218° C., are obtained, (α)$_D$=+14° (chloroform). This compound is dissolved in 60 parts of acetone and 5 parts of 3 N hydrochloric acid are added; after standing for 15 minutes, 1.96 parts of 5-amino-(3,2-c)-isoxazole-17β-acetoxy-5α-androstane hydrochloride, M.P. 232–234° C., are recovered; (α)$_D$=+38° (ethanol), which, when dissolved in 10 parts of pyridine, and diluted with water, yields 1.52 parts of 5'-amino-(3,2-c)-isoxazole-17β-acetoxy-5α-androstane, M.P. 223–224° C.; (α)$_D$=+38° (chloroform). The latter product is refluxed for 1 hour with 20 parts of 70% formic acid, and upon concentration and dilution with water, 1.46 parts of 5'-(N-formyl)-amino-(3,2-c)-isoxazole-17β-acetoxy-5α-androstane are obtained M.P. 70° C. with decomposition; (α)$_D$=+23° (chloroform).

0.7 part of 5'-(N-formyl)-amino-(3,2-c)-isoxazole-17β-acetoxy-5α-androstane are dissolved in 25 parts of ethanol and hydrogenated in the presence of 0.1 part of Adams' platinum until 1 equivalent of hydrogen has been absorbed. The reaction mixture is filtered from the catalyst and concentrated to dryness in vacuum, care being taken that the temperature does not exceed 25° C. When crystallized from ethyl ether, the crude product yields 0.45 part of 2-(carboxylic acid-N-formylamide)-3-amino-17β-acetoxy-5α-androst-2-ene.

Example 6.—2 - (carboxylic acid - N - propyl-amide)-3-amino-5α-androst-2-ene-17β-ol 1.5 parts of propyl aldehyde are added to a solution of 2 parts of 5'-amino(3,2-c)-isoxazole-5α-androstane-17β-ol in 15 parts of methanol, and 1.33 parts of 5'-(N-propylidene-amino) - (3,2-c)-isoxazole-5α-androstane-17β-ol which are filtered off after 8 hours are dissolved in 25 parts of tetrahydrofuran. This solution is added dropwise to a suspension of 2 parts of LiAlH$_4$ in 40 parts of anhydrous ether, over a period of 15 minutes, with stirring. The mixture is allowed to stand at room temperature for 30 minutes, and then refluxed for 1 hour. Any excess LiAlH$_4$ is decomposed with water, and the organic layer is filtered and concentrated to dryness; there are thus obtained 1.21 parts of 5'-(N-propyl-amino)-(3,2-c)-isoxazole-5α-androstane-17β-ol, which are dissolved in 25 parts of ethanol and hydrogenated in the presence of 0.2 part of Adams' platinum until 1 equivalent of hydrogen has been absorbed. The mixture is filtered from the catalyst and crystallized from methanol. 0.83 part of 2-(carboxylic acid-N-propyl-amide)-3-amino-5α-androst-2-ene-17β-ol, M.P. 280°–283° C., are obtained.

*Example 7.—2-carboxylic acid-amide-3-(amino-methylidene-amino)-cholest-2-ene*

5 parts of 5'-amino(3,2-c)-isoxazole-cholestane are dissolved in 80 parts of ethanol and hydrogenated in the presence of 0.5 part of Adams' platinum until 1 molar equivalent of hydrogen has been absorbed. The mixture is filtered from the catalyst, and concentrated to dryness; upon crystallization from methanol, there are obtained 4.2 parts of 2-(carboxylic acid-amide)-3-amino-cholest-2-ene, M.P. 218–221° C.;

$$\lambda^{MeOH}_{max.}\ m\mu\ 282\ (\epsilon=8{,}150)$$

A suspension of 3.2 parts of the latter compound in 23 ml. of dioxane is added to 2.3 parts of ethyl orthoformate and 0.23 part of p-toluenesulphonic acid, and the mixture is stirred for 2 hours. 1.5 parts of pyridine are added, the mixture is filtered, and the filtrate is diluted with water. A product is separated, which is crystallized from MeOH to yield 1.78 parts of 2-(carboxylic acid-amide)-3-ethoxy-methylidene-amino)-cholest-2-ene.

1.2 parts of this latter compound are refluxed for 2 hours with 40 ml. of a 4.8 N ammonia solution in ethanol, and the mixture is then concentrated to a small volume to obtain 0.83 part of 2-carboxylic acid-amide-3-(amino-methylidene-amino)-cholest-2-ene.

*Example 8.—2-carboxylic acid-amide-3-(amino-methylidene-amino)-17α-methyl-5α-androstane-17β-ol*

When the same procedure as that of Example 7 is followed, except for using 3.2 parts of 5'-amino-isoxazole-17α-methyl-5α-androstane-17β-ol as the starting material, there are obtained upon reduction, 2.9 parts of 2-carboxylic acid - amide - 3-amino-17α-methyl-5α-androst-2-ene-17β-ol, M.P. 150° C. with decomposition; $(\alpha)_D=+42°$ (chloroform); upon treatment with ethyl orthoformate, this compound gives 2.2 parts of 2-carboxylic acid-amide-3 - (ethoxy - methylidene-amino)-17α-methyl-5α-androst-2-ene-17β-ol, which, when boiled with an ethanolic solution of ammonia, yields 1.62 of 2-carboxylic acid-amide-3-(amino - methylidene-amino)-17α-methyl-5α-androstane-17β-ol.

*Example 9.—2-carboxylic acid-amide-3-(N-carbamide)-amino-5α-estr-2-ene-17β-ol*

A solution of 4 parts of 5'-amino-(3,2-c)-isoxazole-5α-estrane-17β-ol in 50 parts of ethanol is hydrogenated in the presence of 0.8 part of Adams' platinum until 1 molar equivalent of hydrogen has been absorbed. The mixture is filtered from the catalyst and concentrated to a small volume, and upon filtration 3.41 parts of 2-carboxylic acid-amide-3-amino-5α-estr-2-ene-17β-ol are obtained.

2.75 parts of this compound in 70 parts of anhydrous toluene are refluxed with stirring with 1.9 parts of potassium carbonate and a solution of 2.60 parts of ethyl chlorocarbonate in 20 parts of toluene is added drop-wise for 15 minutes. The mixture is allowed to reflux for 6 hours and filtered and the organic layer is washed with water to neutrality and concentrated to dryness. Upon crystallization from methanol, 1.97 parts of 2-(carboxylic acid-amide) - 3 - (amino-N-ethyl-urethane)-5α-estr-2-ene-17β-ol are obtained. This product (1.5 parts) is allowed to reflux for 4 hours with 50 parts of 4.2 N ammonia in ethanol and concentrated to a small volume; upon cooling, 0.87 part of 2-(carboxylic acid-amide)-3-(N-carbamide)-amino-5α-estr-2-ene - 17β - ol are obtained by crystallization.

*Example 10.—2-carboxylic acid amide-3-(N-carbamide)-amino-5α-androst-2-ene-17β-ol*

When the same procedure as that of Example 9 is followed, except for using 4 parts of 5'-amino-(3,2-c)-isoxazole-5α-androstane-17β-ol as the starting material, 3.41 parts of 2-carboxylic acid-amide-3-amino-5α-androst-2-ene-17β-ol, are obtained, M.P. 270–272° C., upon reduction in the presence of 0.8 part of Adams' platinum; $(\alpha)_D=+74°$ (pyridine). A suspension of 1.41 parts of this latter product in 15 parts of acetone is added to 3 parts of 2 N HCl and, upon dilution with water, yields, 1.12 parts of 2-carboxylic acid-amide-5α-androstane-3-ine-17β-ol, M.P. 242–244° C.

2 parts of 2-carboxylic acid-amide-3-amino-5α-androst-2-ene-17β-ol, when treated with ethyl chlorocarbonate as in the previous example, yield 1.38 parts of 2-carboxylic acid - amide - 3-(N-ethyl-urethane)-amino-5α-androst-2-ene-17β-ol, M.P. 287–289° C., which are boiled in ethanolic ammonia to give 0.87 part of 2-carboxylic acid - amide - 3-(N-carbamide)-amino-5α-androst-2-ene-17β-ol.

*Example 11.—2-carboxylic acid-amide-3-amino-5α-androst-2-ene-17β-ol*

1 part of 2-carboxylic acid-amide-5α-androstane-17β-ol-3-one in 30 parts of ethanol are heated to 130° C. in an autoclave for 6 hours with 0.6 part of ammonium formate. The mixture is then concentrated and diluted with water to obtain 0.86 part of 2-carboxylic acid-amide-3-amino-5α-androst-2-ene-17β-ol.

*Example 12.—2-carboxylic acid-amide-3-N-pentylamine-5α-androst-2-ene-17β-ol.*

0.5 part of 2-carboxylic acid-amide-5α-androstane-17β-ol-3-one in 30 parts of toluene are refluxed for 8 hours with 0.6 part of N-pentylamine, water being removed. The mixture is concentrated to dryness and crystallized from methanol to give 0.48 part of 2-carboxylic acid-amide-3-N-pentylamine-5α-androst-2-ene-17β-ol.

*Example 13.—2-(carboxylic acid - (N - ethoxy - carboyl-amide)-3-N-pentyl)-amino-5α-androst-2-ene-17β-ol*

To 18 parts of 5'-amino(3,2-c)-isoxazole-5α-androstane-17β-ol in 750 parts of toluene are added 6.3 parts of potassium carbonate and, while refluxing for 30 minutes with stirring, there are added 8.7 parts of ethyl chloroformate in 30 parts of toluene. The mixture is refluxed for 6 hours, washed with water, and concentrated to dryness; crystallization from benzene-ether yields 8.32 parts of 5'-N - ethyl - urethane(3,2 - c) - isoxazole - 5α - androstane-17β-ol, M.P. 150–152° C.; $(\alpha)_D=+36°$ (CHCl₃).

7.4 parts of this compound in 400 parts of ethanol are hydrogenated in the presence of 0.34 part of Adams' platinum until 1 molar equivalent of hydrogen has been absorbed. The mixture is filtered from the catalyst, concentrated to dryness, and crystallized from acetone to yield 5.8 parts of 2-(carboxylic acid-(N-ethoxy-carboyl-amide)) - 3 - amino - 5α - androst - 2 - ene - 17β - ol; $(\alpha)_D=+49°$ (CHCl₃);

$$\lambda^{MeOH}_{max.}\ 305\ m\mu\ (\epsilon=12{,}900)$$

This product is suspended in 50 parts of acetone and additioned with 7.5 parts of 3 N HCl; it is then allowed to stand at room temperature for two hours, diluted with water, filtered and finally crystallized from ethyl ether to give 4.2 parts of 2-(carboxylic acid-(N-ethoxy-carboyl-amide))5α-androstane-3-one-17β-ol, M.P. 182–185° C.; $(\alpha)_D=+140°$ (CHCl₃);

$$\lambda^{MeOH}_{max.}\ 301\ m\mu\ (\epsilon=5{,}800)$$

1.2 parts of this product in 40 parts of benzene are refluxed for 4 hours with 4 parts of n-pentylamine, water being removed. The mixture is concentrated to dryness and crystallized from ethyl ether to give 0.83 part of 2-(carboxylic acid - (N - ethoxy - carboyl) - amide) - 3-(N-pentyl)-amino-5α-androst-2-ene-17β-ol;

$$\lambda_{max.}^{MeOH}\ 320\ m\mu\ (\epsilon=19{,}350)$$

*Example 14.—2-[carboxylic acid-(N-ethoxy-carboyl)-amide]-3-(N-butyl)-amino-5α-androst-2-ene-17β-ol*

0.9 part of 2-[carboxylic acid-(N-ethoxy-carboyl)-amide]-5α-androstane-3-one-17β-ol were boiled in 30 parts of benzene and 3 parts of n-butyl-amine thus eliminating water. The reaction mixture was evaporated to dryness to give, after crystallization from ethyl ether, 0.83 part of 2-[carboxylic acid-(N-ethoxy-carboyl)-amide]-3-(N-butyl)-amino-5α-androst-2-ene-17β-ol;

$$\lambda_{max.}^{MeOH}\ 320\ m\mu\ (\epsilon=19{,}350)$$

*Example 15.—2-(carboxylic acid-(N-ethoxy-carboyl)-amide)-3-N-(2',3',5'-tri-O-benzoyl-β-D-ribofuranosyl)-amino-5α-androst-2-ene-17β-ol*

2.8 parts of 2-(carboxylic acid-(N-ethoxy-carboyl)-amide)-5α-androstane-3-one-17β-ol are refluxed for 2 hours with 3.0 parts of 2',3',5'-tri-O-benzoyl-β-D-ribofuranosyl-amine in 100 parts of ethyl acetate. The mixture is washed with water and concentrated to dryness. By subjecting the 7:3 benzene-ethyl acetate fractions to chromatography on silicon gel, there are recovered 1.8 parts of 2-(carboxylic acid-(N-ethoxy-carboyl)-amide)-3 - N - (2',3',5' - tri - O - benzoyl - β - D - ribofuranosyl)-amino-5α-androst-2-ene-17β-ol.

*Example 16.—2-(carboxylic acid-(N-ethoxy-corboyl)-amide)-3-N-(3',5'-di-O-benzoyl-2'-deoxyribofuranosyl)-amino-5α-estr-2-ene-17β-ol*

When the same procedure as that of Example 13 is followed, 7 parts of 5'-amino-(3,2-c)-isoxazole-5α-estrane-17β-ol give 5.2 parts of 5'-N-ethyl-urethane(3,2-c)-isoxazole-5α-estane-17β-ol which, when hydrogenated (see Example 13), yield 4.72 parts of 2-(carboxylic acid-(N - ethoxy - carboyl) - amide) - 3 - amino - 5α - estr-2-ene-17β-ol which, when suspended in 25 parts of acetone, treated with 4 parts of 3 N hydrochloric acid and diluted with water, give 3.86 parts of 2-(carboxylic acid-(N-ethoxy - carboyl) - amide) - 5α - estrane - 3 - one - 17β-ol.

2 parts of this latter compound in 45 parts of ethyl acetate, when boiled with 1.95 parts of 3,5-di-O-benzoyl-2-deoxy-β-D-ribofuranosyl amine for 3 hours, washed with water, and subjected to chromatography on silica gel, give 1.87 parts of 2-(carboxylic acid-(N-ethoxy-carboyl)-amide) - 3 - N - (3',5' - di - O - benzoyl - 2 - deoxy - ribofuransoyl)-amino-5α-ester-2-ene-17β-ol.

*Example 17.—2-(carboxylic acid-N-(ethoxy-carboyl)-amide)-3-N-propyl-amine-estr-2-ene-17β-ol*

0.8 part of 2-(carboxylic acid-N-(ethoxy-carboyl)-amide)-5α-estrane-3-one-17β-ol in 20 parts of chloroform are refluxed for 5 hours with 5 parts of propyl amine. The mixture is washed with water, concentrated to dryness and crystallized from ethyl ether to give 0.21 parts of 2-(carboxylic acid - N - (ethoxy - carboyl) - amide) - 3-N-propyl-amine-estr-2-ene-17β-ol.

*Example 18. — 2-carboxylic acid-N-(ethoxy-carboyl)-amide - 3 - N - (2',3',5' - tri - O - benzoyl - β - D-ribofuranosyl)-cholest-2-ene*

2.3 parts of 2-(carboxylic acid-(N-ethoxy-carboyl)-amide)-cholestane-3-one in 75 parts of ethyl acetate are refluxed for 90 minutes with 2.1 parts of 2',3',5'-tri-O-benzoyl-β-D-ribofuranosyl amine. The mixture is washed with water, concentrated to dryness and subjected to chromatography on silica gel to give 1.03 parts of 2-carboxylic acid-N-(ethoxy-carboyl)-amide-3-N-(2',3',5'-tri-O-benzoyl-β-D-ribofuranosyl)-cholest-2-ene.

*Example 19. — 2-(carboxylic acid-N-(ethoxy-carboyl)-amide) - 3 - N - (3',5' - di - O - benzoyl - 2' - deoxy-β - D - ribofuranosyl) - amino - 17α - methyl - androst-5-ene-17β-ol*

1.8 parts of 2-carboxylic acid-(N-ethoxy-carboyl-amide)-17α-methyl-5α-androstane-3-one-17β-ol in 80 parts of ethyl acetate are refluxed for 2 hours with 2 parts of 3',5'-di-O-benzoyl-2'-deoxy-β-D-ribofuranosyl amine. The mixture is washed with water and subjected to chromatography on silica gel to give 0.63 part of 2-(carboxylic acid-N-(ethoxy-carboyl)-amide)-3-N-(3',5'-di-O-benzoyl - 2' - deoxy - β - D - ribofuranosyl - amino - 17α-methyl-androst-5-ene-17β-ol.

*Example 20.—2-(carboxylic acid-N-methyl-amide)-5α-androstane-17β-ol-3-one*

2.3 parts of 5'-N-ethyl-urethane-(3,2-c)-isoxazole-5α-androstane-17β-ol are dissolved in 40 parts of tetrahydrofuran and added to 2.3 parts of LiAlH₄ in 20 parts of ethyl ether with stirring; the mixture is allowed to stand at room temperature for 40 minutes and refluxed for 6 hours. Any excess LiAlH₄ is decomposed with ethyl acetate and water, any inorganic salt is then filtered off, the mixture is diluted with ether, washed with water and concentrated to dryness to yield 1.44 parts of 5'-N-methyl-(3,2-c)-isoxazole-5α-androstane-17β-ol, which are dissolved in 30 parts of ethanol. The mixture is hydrogenated in the presence of 0.1 part of Adams' platinum until 1 equivalent of hydrogen has been absorbed. The catalyst is filtered off, the mixture is concentrated to dryness and crystallized from acetone to give 1.22 parts of 2-(carboxylic acid-N-methyl-amide)-3-amino-5α-androst-2-ene-17β-ol.

This compound is suspended in 12 parts of acetone and complete dissolution occurs upon the addition of 3 parts of 2 N HCl; the mixture is allowed to stand for 2 hours, diluted with water, filtered and crystallized from ethyl ether to give 0.96 part of 2-carboxylic acid-N-methyl-amide)-5α-androstane-17β-ol-3-one.

*Example 21.—2-(carboxylic acid-(N-acetyl)-amide)-3-N-pentyl-amine-17α-methyl-androst-2-ene-17β-ol*

5 parts of 3'-amino-(3,2-c)-isoxazole-17α-methyl-5α-androstane-17β-ol, dissolved in 30 parts of acetic anhydride, are heated on a water bath for 15 minutes, 40 parts of pyridine are added and the resulting solution is carefully diluted with water. Filtration yields 4.97 parts of 5' - (N - acetyl) - amino - (3,2 - c) - isoxazole - 17α-methyl-5α-androstane-17β-ol, M.P. 246–248° C.; (α)_D= +31° (chloroform).

4 parts of this latter product, dissolved in 200 parts of ethanol, are hydrogenated in the presence of 0.35 part of Adams' platinum until 1 molar equivalent of hydrogen has been absorbed. The catalyst is filtered off. The mixture is concentrated in vacuo, care being taken that the temperature does not exceed 25° C., and crystallized from sulphuric ether to give 1.8 parts of 2-(carboxylic acid-(N - acetyl) - amide) - 3 - amino - 17α - methyl - androst-2-ene-17β-ol. One part of this product is cold-dissolved in 5 parts of acetone, 0.5 part of N hydrochloric acid are added, the solution is allowed to stand for 2 hours, and diluted with water to obtain 0.81 part of 2-(carboxylic acid - (N - acetyl) - amide) - 17α - methyl - 5α - androstane-17β-ol-3-one.

A solution of this latter product in 20 parts of benzene is refluxed for 1 hour with one part of n-pentyl amine. The mixture is concentrated to dryness and crystallized from sulphuric ether to obtain 0.78 part of 2-(carboxylic acid - (N - acetyl) - amide) - 3 - N - pentyl - amine-17α-methyl-androst-2-ene-17β-ol.

*Example 22.—2-(carboxylic acid(N-acetyl)-amide)-3-amino-17β-acetoxy-5α-androst-2-ene*

3.3 parts of 5'-amino-(3,2-c)-isoxazole-5α-androstane-17β-ol are dissolved in 25 ml. of pyridine and cooled to approximately 0° C.; 5 parts of acetyl chloride are then added. After standing for 30 minutes, the mixture is brought to room temperature and allowed to stand overnight. Upon dilution with water, filtration and crystallization from methanol, there are obtained 3.57 parts of 5'-N-acetylamino-(3,2-c)-isoxazole-17β-acetoxy-5α-androstane, M.P. 253–255° C.

2.5 parts of this latter product, dissolved in 150 parts of ethanol, are hydrogenated in the presence of 0.5 part of Adams' platinum until one molar equivalent of hydrogen has been absorbed. The catalyst is filtered off; the mixture is concentrated to dryness in vacuo, care being taken that the temperature does not exceed 25° C., and crystallized from ethyl ether to obtain 1.7 parts of 2-(carboxylic acid - (N - acetyl) - amide) - 3 - amino - 17β-acetoxy-5α-androstane-2-ene.

*Example 23.—2-(carboxylic acid-(N-butanoyl)-amide)-cholest-2-ene-3-N-butyl-amine*

To 2.25 parts of 5'-amino-(3,2-c)-isoxazole-cholestane, dissolved in 25 parts of pyridine, are added 1.06 parts of butanoyl chloride at 0° C. and the mixture is allowed to stand at room temperature overnight. The mixture is diluted with water, steam-distilled, the solid residue is extracted with methylene chloride and the organic layer is concentrated to dryness. Upon crystallization from ethyl ether-hexane, there are obtained 2.3 parts of 5'-(N-butanoyl)-amino-(3,2-c)-isoxazole-cholestane.

2 parts of this produce are dissolved in 30 parts of ethanol and hydrogenated in the presence of 0.3 part of Adams' platinum. The catalyst is filtered off and the mixture is concentrated to dryness.

Crystallization from ethyl ether gives 1.82 parts of 2-(carboxylic acid-(N-butanoyl)-amide)-cholest - 2 - ene-3-amine.

1.5 parts of this product, dissolved in 10 parts of methanol are added 3 parts of 2 N sulphuric acid, the solution is allowed to stand at room temperature for one hour, diluted with water, filtered and crystallized from hexane. 1.3 parts of 2-(carboxylic acid-(N-butanoyl)-amide)-cholestane-3-one are obtained.

0.8 part of this product is boiled with 1.5 parts of butyl amine in 10 parts of benzene for 2 hours. The mixture is concentrated to dryness and crystallized from ethyl ether-hexane to obtain 0.83 part of 2-(carboxylic acid-(N-butanoyl)-amide)-cholest - 2 - ene - 3 - N - butyl-amine.

*Example 24.—5'-N - benzyl-amine-(3,2-c)-isoxazole-17α-methyl-5α-androstane-17β-ol*

To 1.2 parts of 5'-amino-(3,2-c)-isoxazole-17α-methyl-5α-androstane-17β-ol in 15 parts of methanol are added 0.6 part of benzoic aldehyde. After standing at room temperature for 6 hours, the benzylidene derivative precipitates and is filtered and crystallized from methylene-chloride-methanol to obtain 1.06 parts of 5'-N-benzylidene-amino-(3,2-c)-isoxazole - 17α - methyl - 5α - androstane-17β-ol, M.P. 208–209° C.; $(\alpha)_D=+21°$ (chloroform).

To 0.5 part of this product, dissolved in 20 ml. of methanol, are added 0.20 part of sodium borohydride dissolved in 2 parts of water. The mixture is neutralized with 15% acetic acid, diluted with water and filtered. Upon crystallization from ethyl ether-hexane, there are obtained 0.32 part of 5'-N-benzyl-amino-(3,2-c)-isoxazole-17α-methyl-5α-androstane-17β-ol, M.P. 118–120° C.;

$(\alpha)_D=+4°$ (chloroform).

*Example 25.—5'-N-benzyl-amino - (3,2-c) - isoxazole-5α-androstane-17β-ol*

When the reduction is carried out as in Example 24, except for using 0.5 part of 5'-(N-benzylideneamino)-(3,2-c)-isoxazole-5α-androstane-17β-ol as the starting material, there are obtained 0.41 part of 5'-benzyl-amino-(3,2-c)-isoxazole-5α-androstane-17β-ol, M.P. 124–126° C.; $(\alpha)_D=+20°$ (chloroform).

*Example 26.—2-(carboxylic acid-(N-ethyl)-amide)-5α-androst-2-ene-17β-ol-3-amine*

To a solution of one part of 5'-amino-(3,2-c)-isoxazole-5α-androstane-17β-ol in 10 parts of glacial acetic acid are added 5 parts of sodium acetate and then 20 parts of ethanol and 20 parts of water. To the mixture, cooled to 0° C., there is added 8 parts of acetic aldehyde, and thereafter 2 parts of sodium borohydride in small amounts over 30 minutes. While keeping the temperature at approximately 0° C., the mixture is diluted with water and filtered; crystallization from ethyl ether-hexane yields 0.75 part of 5'-N-ethyl-amino-(3,2-c)-isoxazole-5α-androstane-17β-ol, which are hydrogenated in the presence of 0.12 part of Adams' platinum, after having been dissolved in 25 parts of ethanol.

When 1 molar equivalent of hydrogen has been absorbed, the catalyst is filtered off, the mixture is concentrated to dryness and crystallized from ethyl ether to obtain 0.32 part of 2-(carboxylic acid-(N-ethyl)-amide)-5α-androst-2-ene-17β-ol-3-amine.

*Example 27.—2-(carboxylic acid-amide)-3-(amino-methylideneamino)-androsta-2,4-diene-17β-ol*

A solution of 6 parts of 2-(carboxylic acid-amide)-3-ethoxy-androsta-2,4-diene-17β-ol in 20 parts of 90% acetic acid is heated on a water bath for 20 minutes. The mixture is cooled, diluted with water and filtered. Upon crystallization from acetone, there are obtained 4.1 parts of 2-(carboxylic acid-amide)-androst-4-ene-17β-ol-3-one.

3.3 parts of this compound, to which are added 1.4 parts of anhydrous ammonium formate, are heated to 130° C. with 50 parts of ethanol in an autoclave for 5 hours. The mixture is concentrated, diluted with water and filtered to obtain 2.9 parts of 2-(carboxylic acid-amide)-3-amino-androsta-2,4-diene-17β-ol.

To a solution of this compound (2.1 parts) in 18 parts of dioxane is added 2.2 parts of ethyl orthoformate and 0.19 part of p-toluenesulphonic acid. The mixture is allowed to stand at room temperature for 6 hours, 0.5 part of pyridine are added and the resulting mixture is diluted with water. It is then extracted with methylene chloride, washed with water until neutral and crystallized from methanol to give 1.05 parts of 2-(carboxylic acid-amide)-3-(ethoxy-methylideneamino)-androsta-2,4 - diene-17β-ol.

0.8 part of this latter compound, dissolved in 20 parts of 4.2 N ammonia in ethanol, are refluxed for 4 hours, to yield, upon concentration, 0.41 part of 2-(carboxylic acid-amide)-3-(amino-methylideneamino) - androsta - 2, 4-diene-17β-ol.

*Example 28.—2-(carboxylic acid-amide)-3-(N-carbamide)-amino-androsta-2,4-diene-17β-ol*

A solution of 0.8 part of 2-(carboxylic acid-amide)-3-amino-androsta-2,4-diene-17β-ol in 30 parts of toluene is refluxed with 0.315 part of potassium carbonate, and 0.44 part of ethyl chlorocarbonate in 10 parts of toluene are added with stirring. The mixture is allowed to reflux for 4 hours, filtered, washed with water until neutral and concentrated to dryness.

Upon crystallization from methanol, there are obtained 0.48 part of 2-(carboxylic acid-amide)-3-N-(ethoxy-carboyl)-amino-androsta-2,4-diene-17β-ol.

A solution of 0.3 part of this compound in 30 parts of 4.2 N ethanolic ammonia, when boiled on a water bath for 3 hours, concentrated and filtered, gives 0.18 part of 2-(carboxylic acid-amide)-3-(N-carbamide) - amino-androsta-2,4-diene-17β-ol.

3,308,116

*Example 29.—2'-(carboxylic acid-amide)-3-N-(ethoxy-carboyl)-amino-cholesta-2,4-diene*

5.2 parts of 2-(carboxylic acid-amide)-3-N-butoxy-cholesta-2,4-diene are dissolved in 30 parts of 90% acetic acid and heated on a water bath for 25 minutes. The mixture is diluted with water, filtered and crystallized from methylene chloride-methanol, to obtain 3.95 parts of 2-(carboxylic acid-amide)-cholest-4-ene-3-one. A solution of 3.2 parts of 2-(carboxylic acid-amide)-cholest-4-ene-3-one in 120 parts of ethanol is heated to 130° C. with 4 parts of anhydrous ammonium formate in an autoclave for 4 hours. The mixture is concentrated, and, upon cooling and filtering, a precipitate is recovered, which consists of 2.72 parts of 2-(carboxylic acid-amide)-3-amino-cholesta-2,4-diene.

1.3 parts of this latter compound are dissolved in 80 parts of hot toluene, 0.630 part of potassium carbonate and 0.88 part of ethyl chloroformate are added and the mixture is refluxed for 4 hours. The mixture is cooled, washed with water, concentrated to dryness and crystallized from ethyl ether-methanol to obtain 0.82 part of 2'-(carboxylic acid-amide)-3-N-(ethoxy-carboyl) - amino-cholesta-2,4-diene.

*Example 30.—2-(carboxylic acid-amide)-3-N-(amino-methylidene)-amino-cholesta-2,4-diene*

To a suspension of 0.9 part of (2-carboxylic acid-amide)-3-amino-cholesta-2,4-diene in 4.8 parts of dioxane is added 1.2 parts of ethyl chloroformate, 0.81 part of a solution prepared by dissolving 0.25 part of p-toluenesulphonic acid in 2.7 parts of dioxane and 0.55 part of absolute ethanol.

The mixture is allowed to stand at room temperature for 12 hours, 0.5 part of pyridine are added, and the mixture is diluted with water, filtered and crystallized from methanol to obtain 0.74 part of 2-(carboxylic acid-amide)-3-N-(ethoxy-methylidene) - amino-cholesta - 2,4-diene.

0.28 part of this latter compound are refluxed for 2 hours with 10 parts of a saturated ethanolic solution of ammonia. The mixture is concentrated and yields 0.12 part of 2-(carboxylic acid-amide)-3-N-(amino-methylidene)-amino-cholesta-2,4-diene.

*Example 31. — 2-carboxylic acid-(N-methylamide)-3-N-(ethoxy-methylidene) - amino-17α - methyl-androsta-2,4-diene-17β-ol*

3.2 parts of 3-n-butoxy-2-(carboxylic acid-(N-methyl)-amide) - 17α - methyl-androsta-2,4-diene-17β-ol, when treated with 90% acetic acid following the same procedure as that of Example 27, give 2.05 parts of 2-carboxylic acid-N-methyl-amide-17α - methyl-androst-4-ene-17β-ol-3-one. By heating with ammonium formate in ethanol, there are obtained 1.87 parts of 2-carboxylic acid-(N-methyl-amide)-3-amino-17α - methyl-androsta-2,4-diene-17β-ol. This latter compound, if the procedure of Example 27 is again followed, gives 1.32 parts of 2-carboxylic acid - (N-methyl-amide)-3-N - (ethoxy-methylidene)-amino-17α-methyl-androsta-2,4-diene-17β-ol.

*Example 32. — 2-carboxylic acid-N-methyl-amide-3-N-(ethoxy-carboyl)-amino-estra-2,4-diene-17β-ol*

If the same procedure of Example 29 is followed, except for using 3.6 parts of 2-carboxylic acid-N-methyl-amide-3-N-butoxy-estra-2,4-diene-17β-ol, as the starting material, 2.65 parts of 2-carboxylic acid-N-methyl-amide-estra-4-ene-17β-ol-3-one are obtained by heating in 90% acetic acid. 2.2 parts of this compound in ethanol, when treated with ammonium formate (see Example 27), give 1.96 parts of 2-carboxylic acid-N-methyl-amide-estra-2,4-diene-17β-ol which, upon subsequent treatment with ethyl chlorocarbonate (see Example 28), yield 1.28 parts of 2-carboxylic acid-N-methyl-amide-3-N - (ethoxy-carboyl)-amino-estra-2,4-diene-17β-ol.

What we claim is:
1. The compounds of the formula:

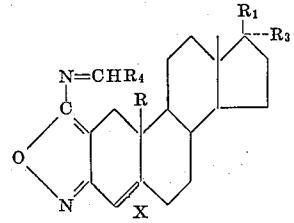

wherein R is a member selected from the class consisting of H and CH$_3$, R$_1$ is a member selected from the class consisting of C$_8$H$_{17}$ and OR$_2$, R$_2$ being a member selected from the class consisting of hydrogen and an acyl radical derived from an aliphatic acid of from 2 to 10 carbon atoms, R$_3$ is a member selected from the class consisting of H and lower alkyl, R$_4$ is a member selected from the class consisting of lower alkyl and phenyl, and X is a member selected from the class consisting of single and double bonds.

2. The compounds of the formula:

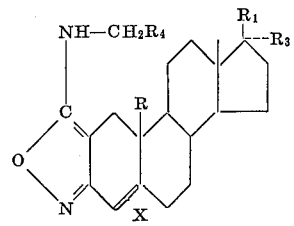

wherein R is a member selected from the class consisting of H and CH$_3$, R$_1$ is a member selected from the class consisting of C$_8$H$_{17}$ and OR$_2$, R$_2$ being a member selected from the class consisting of H and an acyl radical derived from an aliphatic acid of from 2 to 10 carbon atoms, R$_3$ is a member selected from the class consisting of H and lower alkyl, R$_4$ is a member selected from the class consisting of lower alkyl and phenyl, and X is a member selected from the class consisting of single and double bonds.

3. The compounds of the formula:

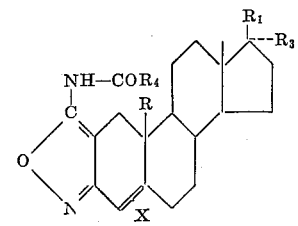

wherein R is a member selected from the class consisting of H and CH$_3$, R$_1$ is a member selected from the class consisting of C$_8$H$_{17}$ and OR$_2$, R$_2$ being a member selected from the class consisting of H and an acyl radical derived from an aliphatic acid of from 2 to 10 carbon atoms, R$_3$ is a member selected from the class consisting of H and lower alkyl, R$_4$ is a member selected from the class consisting of H, OEt, lower alkyl and phenyl, and X is a member selected from the class consisting of single and double bonds.

4. The compounds of the formula:

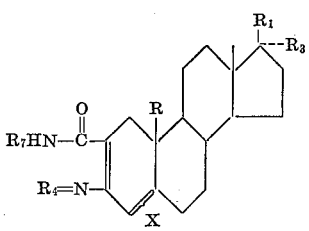

wherein R is a member selected from the class consisting of H and CH$_3$, R$_1$ is a member selected from the class consisting of C$_8$H$_{17}$ and OR$_2$ in which R$_2$ is a member selected from the class consisting of H and an acyl radical derived from an aliphatic acid of from 2 to 10 carbon atoms, R$_3$ is a member selected from the class consisting of H and lower alkyl, R$_4$ is a member selected from the class consisting of the grouping 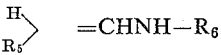 and =CHO—R$_6$, R$_5$ being a member selected from the class consisting of H, lower alkyl, ribosyl, 2'-deoxyribosyl, 2',3',5'-tri-O-benzoyl-ribosyl, 3',5'-di-O-benzoyl-2'-dexoyribosyl,

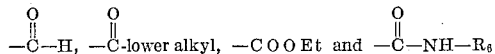

and R$_6$ being a member selected from the class consisting of H and lower alkyl, R$_7$ is a member selected from the class consisting of H, lower alkyl, benzyl, acyl of 1 to 4 carbon atoms,

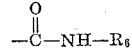

and COOEt, and X is a member selected from the class consisting of single and double bonds.

References Cited by the Examiner

UNITED STATES PATENTS 3,145,200   8/1964   Clinton et al. _____ 260—239.55

LEWIS GOTTS, *Primary Examiner.*

T. M. MESHBESHER, *Assistant Examiner.*